Nov. 20, 1962  B. VON PLATEN  3,064,558
PRESS STAND
Filed March 13, 1956  3 Sheets-Sheet 1

Inventor
Baltzar von Platen
By
Attorney

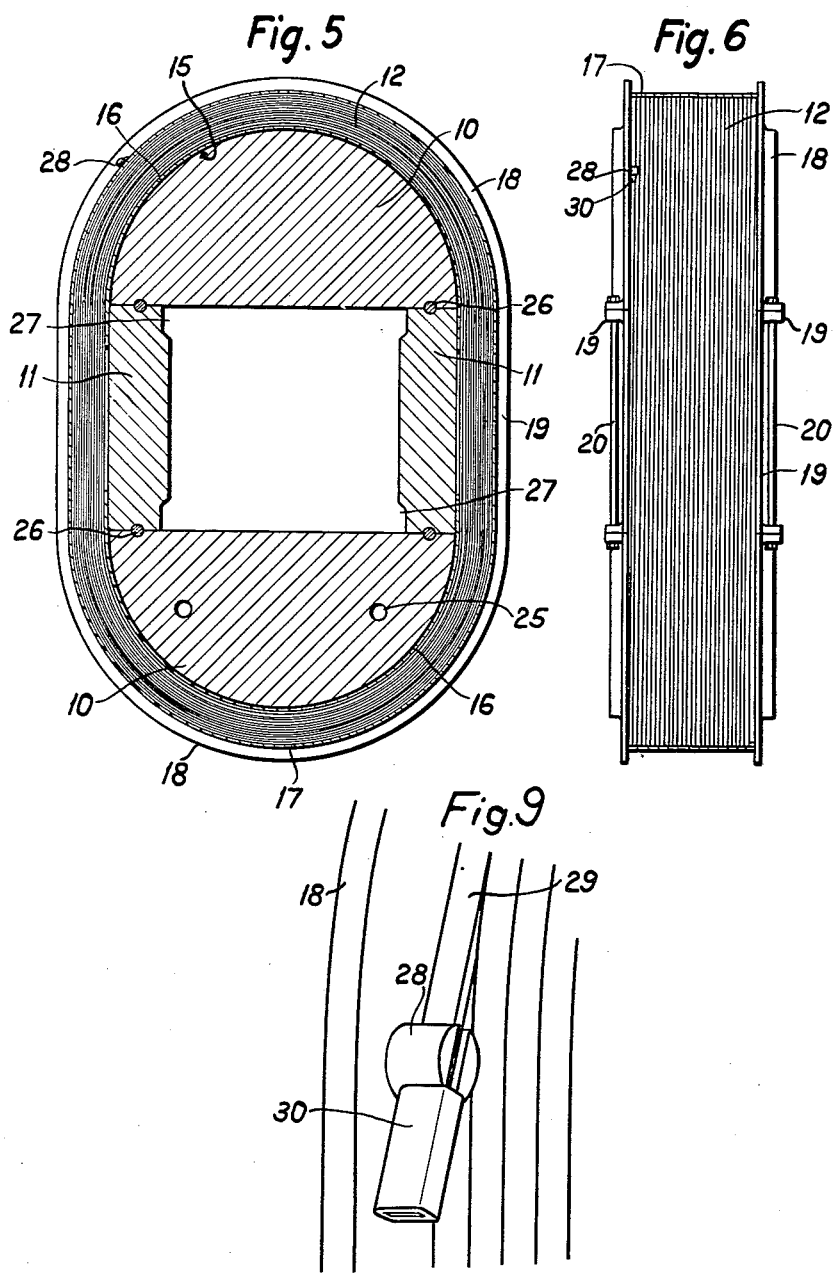

A-A

Inventor
Baltzar von Platen

United States Patent Office 3,064,558
Patented Nov. 20, 1962

3,064,558
PRESS STAND
Baltzar von Platen, Stockholm, Sweden, assignor to Allmänna Svenska Elektriska Aktiebolaget, Vasteras, Sweden, a Swedish corporation
Filed Mar. 13, 1956, Ser. No. 571,282
Claims priority, application Sweden Mar. 18, 1955
4 Claims. (Cl. 100—214)

In hydraulic presses there are large oppositely directed forces, which are taken up by a stand. This stand is in small presses generally cast in one piece, but in large presses the stand generally consists of two yokes held together by strong bolts or rods. In both cases the stand will be very heavy, because in both cases the stand constitutes a statically undetermined system, so that the stresses in the different parts of the stand cannot be exactly calculated. For the sake of security it is therefore necessary to calculate with very low specific stresses.

The present invention concerns a stand for presses, which is able to take up very large forces. In the stand according to the invention the stresses may be calculated very closely, and it is therefore possible to utilize the material in the most economical way. In the stand according to the invention it is also possible to use cold drawn material with high tensile strength in the most strained parts of the stand. The total weight of the stand will therefore, in relation to the forces taken up, be very low.

The stand according to the invention consists chiefly of two prismatical yokes having semi-circular cross-section, which are held in a certain distance from each other by means of two parallelepipedical members in contact with flat surfaces of the yoke and of members holding the yokes together. The invention is chiefly characterized in that the yokes are held together by means of strips of steel, which are wound around the two yokes in a plurality of layers, said strip forming a mantle being in contact with the semi-circular surfaces of the yokes, while a lubrication layer concentric with the curved surfaces of the yokes, is provided and is arranged between the mantle and the curved surfaces of the yokes. A sheet is suitably arranged between the layer of lubricating material and the mantle, which prevents the lubricating medium from penetrating between the different layers of the strip mantle. Powder of graphite is used as the lubricating medium.

Figure 1:
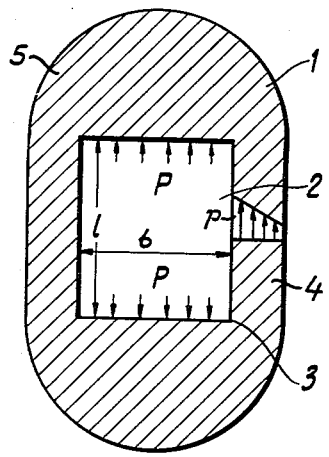
Figure 2:
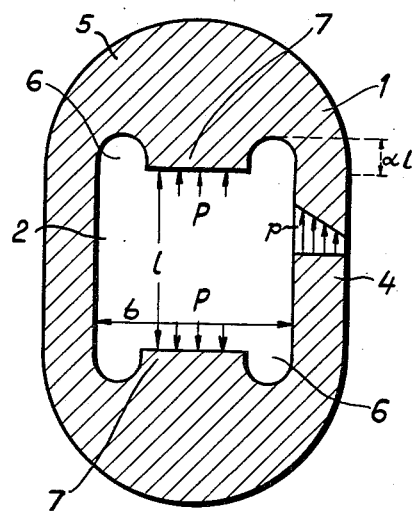
Figure 3:
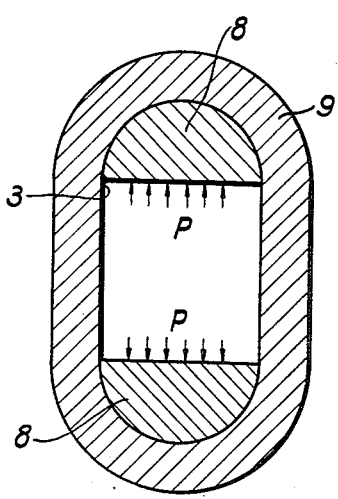
Figure 4:
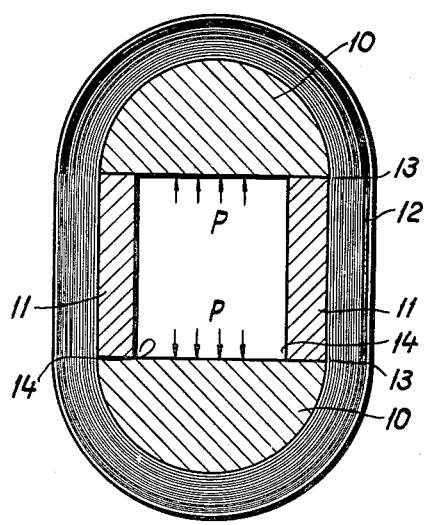
Figure 7:
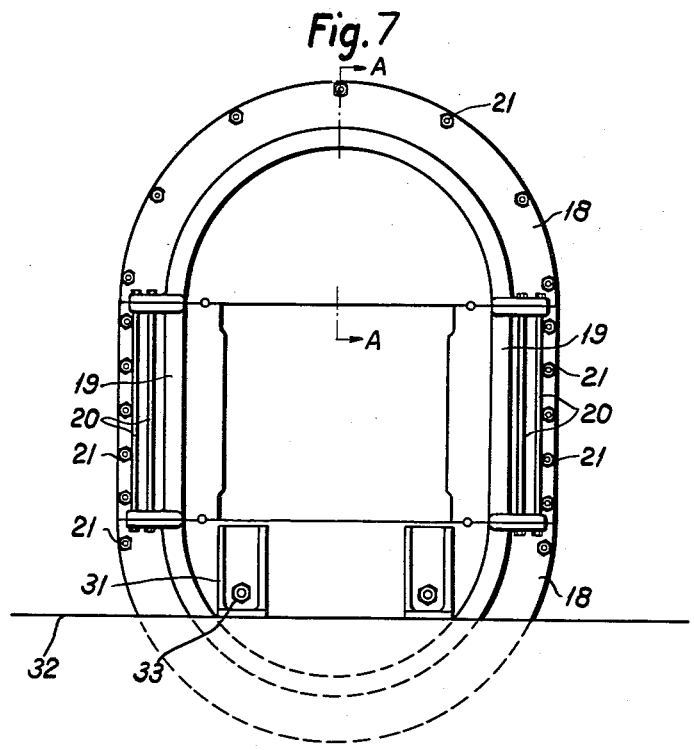
Figure 8:
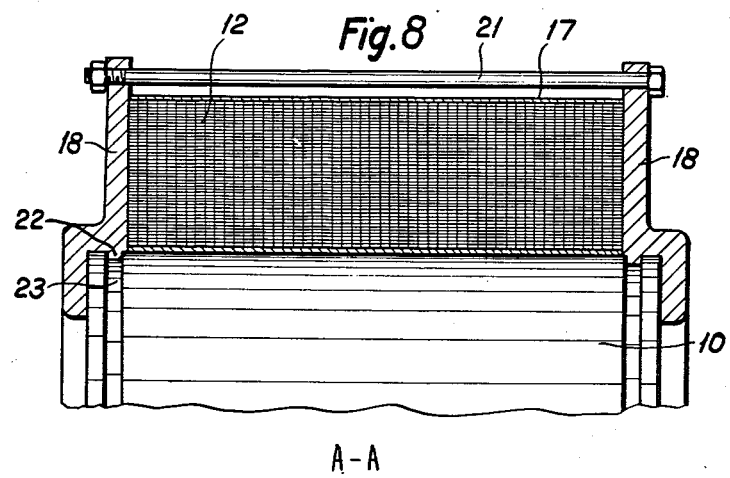

The invention is best understood reference being made to the accompanying drawings. FIGS. 1 and 2 have only for their purpose to indicate schematically the disadvantages of press stands made in one piece, e.g. by steel casting. FIG. 3 shows schematically a stand, which is a step on the way to the stand according to the present invention. The stand according to FIG. 3 is composed of two prismatic yokes with semi-circular cross-section, which are held together by means of a solid mantle formed as a chain link. FIG. 4 shows schematically a stand according to the invention, and FIGS. 5–8 show suitable forms of this stand. FIG. 5 is a vertical section through the stand and FIG. 6 is a side view. FIG. 7 is an end view of the stand. FIG. 8 is a section along the line A—A in FIG. 7. FIG. 9 shows a method for fastening the strip at the ends.

The stand according to FIG. 1 is made in one piece with a practically rectangular opening 2, the height of which being 1 and the width $b$. The corners 3 are sharp. In the opening the force P acts on two opposite sides. This force causes stresses in the two legs 4. As these legs 4 can be regarded as two beams which are rigidly fixed in two other beams 5, which are actuated by the force P, the legs 4 will be object of a pure tensile stress on one hand and of a bending torque caused by the deformation of the yokes 5 on the other hand. The specific stress $p$ will thus vary along the legs 4, as in the diagram shown in the right leg of the figure. In the corners 3 also stress concentrations will appear, so that the distribution of stresses will be still more unsatisfactory, when the stand becomes loaded, and therefore the yielding point in the corners will often be exceeded and the material there will be exposed to a fatigue stress, with the result that cracks will appear in the material and finally the stand will burst.

If, as shown in FIG. 2, the sharp corners 3 are replaced by fillets 6, the stress in the corners at the same load P will be decreased a little, but the improvement is very small, so that also this design will be combined with risks. Further, in this latter performance of the stand the total elastic elongation will be larger than in the design according to FIG. 1, because the length the legs 4 will in this case be $l+2\alpha l$. At load the parts 7 will also be compressed to a certain extent.

FIG. 3 shows a further form of the stand. According to this figure, the stand is composed of link-formed mantle 9 with two internal semi-cylindrical surfaces and two yokes 8 having semi-circular cross-section. If it is assumed that the friction between the parts 8 and 9 is so small that the parts can slide against each other, the stresses in the legs of the part 9, when the stand is exposed to the force P, will be practically evenly distributed over the whole cross-section in the straight parts of the link 9. This state is however very difficult to reach, because it is very difficult to get a good and reliable lubrication by graphite between so large and rigid members, as the deformation may reach 1 or 2 cm. In reality the stand according to FIG. 3 will behave as a rigid system, and with respect to the strength the design will be equivalent with the design of FIG. 1. The stand will therefore burst in the corners 3.

FIG. 4 shows a section through a stand according to the invention. The stand consists of two prismatic yokes 10 having semi-circular cross-section and two parallelepipedical distance pieces 11. The parts 10 and 11 are held together by a mantle 12 made from steel strip wound in a plurality of layers one upon the other. Between the curved surfaces of the parts 10 and the mantle 12 there is a lubricating layer, e.g., of graphite. Between the different layers of the strip there shall not be any friction decreasing material. When a mantle is used which consists of several layers of easily bent steel strip laid one upon the other, it is possible to attain a reliable lubrication by graphite between the mantle 12 and the parts 10. By this the sliding between the semi-cylinders 10 and the inner curved surface of the strip mantle 12 is secured, when the deformation of the parts 10 and 12 becomes unequal. By this step the stand will be statically determined, so that the stresses in it can be calculated. As the steel strip in the mantle may be of cold drawn material with a high tensile strength, a high tensile stress in the mantle can be allowed, and the weight of the stand will be therefore very low in relation to the force which it can withstand. The strip in the mantle 12 is given at winding a certain prestress. This pre-stress may be so calculated that the stress in the distance pieces 11 will be immediately below the yielding point of the material, when the whole strip mantle is finished. In winding the strip, the pre-stress in the different layers is suitably chosen so that the stress for the highest allowable force P will be practically the same in all layers. The total force acting on the two parallelepipedical members 11 will of course at least be equal to the largest force P taken up by the stand. It is thus clear that the tension, i.e. the displacement of the yokes 10, when the force P changes from O to $P^{max}$, will be equal to the elongation of the distance pieces 11, when the load in these pieces decreases from its highest to its lowest value. By the fact that the force actuated by the part 11 on the yokes 10 decreases when the force P increases, the increase of the distance betwen the yokes 10 will be the smallest possible. Any additional stresses in the material in the corners 14 may not appear either, because the members 10 and 11 are not integral. When the force P exceeds a certain value, there will be a small interstice between the contact surfaces 13 of the parts 10 and 11, and this interstice commences just at the corner 14 and is deepened in accordance to the increase of the power P.

In the FIGS. 5-9, 16 designates smooth mantle sheets, which are arranged between the strip mantle 12 and the yokes 10. Between the sheets 16 and the yokes 10 there is a piece of cloth 15 impregnated with graphite. 17 designates a sheet cover at the outer side of the strip mantle 12. 18 and 19 designate flanges, which are held together by means of bolts 20 and 21. The flanges 18 are fixed axially in relation to the yokes 10 by means of rims 22 on the flanges 18, which project into the slots 23 in the yokes 10. 25 designates holes used for attaching carrying members for transportation of the yokes 10. 26 are short guide pins, by which the parts 10 and 11 are fixed in relation to each other, before the winding of the mantle 12 has commenced.

When, at winding the mantle, the yokes 10 are exposed to the force P, they will be bent to a certain extent, so that the transmission of the force from the yokes to the distance pieces 11 is concentrated to the inner edges of the distance pieces, whereby the distance pieces will be bent outwards, so that their end surfaces will no longer be parallel with each other. By removing material at the places 27, the bending of the yokes 10 is however, not prevented, but the axial forces on the distance pieces 11 will be removed outwards, so that the said tendency of bending the distance pieces outwards is diminished. The said bending outwards can also be prevented by giving the parts 11 the form of parallelepipeds but with their end surfaces, in contact with the yokes, not exactly parallel.

FIG. 9 shows how the end of the strip 29 of the strip mantle 12 is fixed. In a flange 18 a bolt 28 is inserted, which is provided with a slot having a width equal to the thickness of the strip 29. When the mantle 12 is finished, the strip 29 is inserted in the slot 20 of the bolt 28, and the sleeve 30, which before has been applied on the strip, is jammed close to the bolt 28. The stress in the strip will therefore be taken up by the bolt 28, the strip being cut off. The stand is carried by a plurality of consoles 31, which are attached to one of the yokes 10 by means of the bolts 33. These consoles rest on a base 32.

The invention is of course not limited to the form shown in the figures. It may, for instance, be suitable to replace the semi-circular section of the yokes by another one. The cross-section can for instance be a part of an ellipse of the like. It may be suitable to choose a cross-section having a radius of curvature continuously changing against infinity at the contact with the distance pieces.

I claim as my invention:

1. A stand for hydraulic presses and the like, comprising two yokes each of substantially semi-circular cross-section arranged in parallel and spaced relation and with their flat surfaces opposed to each other, substantially parallelepipedal spacing members arranged between and engaging the flat surfaces of said yokes, a loop of steel strip wound in a plurality of layers around the curved surfaces of said yokes, the individual layers of said loops being in direct frictional contact with each other, and a layer of lubricating material interposed between the inner surface of the innermost layer of said loop and the curved surface of each of the yokes.

2. A stand according to claim 1, in which the said lubricating material is a layer of graphite powder.

3. A stand according to claim 1, comprising a sheet arranged between a layer of lubricating material and each yoke.

4. A stand according to claim 1, in which each of said spacing members has its yoke engaging ends slightly inclined with respect to each other.

References Cited in the file of this patent

UNITED STATES PATENTS 2,161,838     Thompson _____ June 13, 1939

FOREIGN PATENTS 1,019,533     France _____ Jan. 22, 1953